(12) United States Patent
Matsuura et al.

(10) Patent No.: US 6,322,925 B1
(45) Date of Patent: Nov. 27, 2001

(54) METAL HYDRIDE ALKALINE STORAGE CELL

(75) Inventors: Yoshinori Matsuura, Hirakata; Mitsuzo Nogami, Itano-gun; Reizo Maeda, Hirakata; Katsuhiko Shinyama, Higashiosaka; Ikuo Yonezu; Koji Nishio, both of Hirakata, all of (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/141,140

(22) Filed: Aug. 27, 1998

(30) Foreign Application Priority Data

Aug. 28, 1997 (JP) .................................................. 9-232177

(51) Int. Cl.$^7$ ........................... H01M 10/24; H01M 4/58
(52) U.S. Cl. ......................................... 429/218.2; 420/900
(58) Field of Search ......................... 429/218.2; 420/900

(56) References Cited

U.S. PATENT DOCUMENTS

| 5,506,070 | 4/1996 | Mori et al. . |
| 5,879,429 | * 3/1999 | Yamamura et al. . |
| 6,040,087 | * 3/2000 | Kawakami . |

FOREIGN PATENT DOCUMENTS

| 4-169059 | 6/1992 | (JP) . |
| 5-213601 | 8/1993 | (JP) . |
| 7-207493 | 8/1995 | (JP) . |
| 7-211344 | 8/1995 | (JP) . |
| 8-157902 | 6/1996 | (JP) . |
| 8-333603 | 12/1996 | (JP) . |
| 9-49039 | 2/1997 | (JP) . |
| 9-63581 | 3/1997 | (JP) . |
| 10-134806 | * 5/1998 | (JP) . |

* cited by examiner

Primary Examiner—Carol Chaney
Assistant Examiner—Susy Tsang
(74) Attorney, Agent, or Firm—Armstrong, Westerman, Hattori, McLeland & Naughton, LLP

(57) ABSTRACT

A metal hydride alkaline storage cell of the present invention comprises a positive electrode, a separator impregnated with an electrolyte, and a negative electrode comprising hydrogen-absorbing alloy powder. On the surface of the hydrogen-absorbing alloy powder, there is formed a layer of hydrogen-absorbing alloy oxide, and on the layer of the oxide, there is dotted a catalytic metal formed in a granular state by adding a substance soluble in the electrolyte. The substance is selected from the group consisting of a metal fluoride, a metal iodide, and a metal sulfide. The proportion of the metal fluoride, the metal iodide, or the metal sulfide in adding is restricted within the range of from 0.1 to 2.5 wt. % based on the weight of hydrogen-absorbing alloy powder. When the layer of the hydrogen-absorbing alloy oxide is formed on the surface of the hydrogen-absorbing alloy powder, the reaction area on the surface of the hydrogen-absorbing alloy is increased due to the roughness of the layer. Consequently, the catalytic action of the metal is fully utilized by dotting a catalytic metal on the alloy surface, and thereby the inner pressure characteristic high-rate charge characteristic) of a cell is improved.

4 Claims, No Drawings

METAL HYDRIDE ALKALINE STORAGE CELL

BACKGROUND OF THE INVENTION (1) Field of the Invention

This invention relates to a metal hydride alkaline storage cell and a manufacturing method thereof, and more particularly to a metal hydride alkaline storage cell having an improved hydrogen-absorbing alloy surface and a manufacturing method thereof.

(2) Description of the Prior Art

The cell performance of a metal hydride alkaline storage cell employing hydrogen-absorbing alloy as a negative electrode active material largely depends on the degree of activation of the hydrogen-absorbing alloy therein. For this reason, a hydrogen-absorbing alloy used in this type of storage cells is pulverized into fine powder to enlarge a reaction area involved in the electrochemical reaction, to intensify the filling density in the electrode substrate, and thereby to enhance the energy density.

However, since hydrogen-absorbing alloy is a very active substance, it is corroded as a charge-discharge cycle is repeated, which results in a short cycle life.

In light of this problem, there has been suggested a hydrogen-absorbing alloy electrode wherein a metal (cobalt, nickel, and the like) oxide or hydroxide layer is formed on the surface of hydrogen-absorbing alloy powder.

Nevertheless, this type of hydrogen-absorbing alloy electrode still has such shortcomings that, when oxygen gas is generated in overcharging, the contact of the oxygen gas with the hydrogen-absorbing alloy is hindered by the metal oxide layer etc. on the surface of the hydrogen-absorbing alloy powder, which results in deterioration of absorbing performance of the oxygen gas and, consequently, high-rate charge characteristic.

In view of the above problems, Japanese Unexamined Patent Application No. 08-333603 discloses a cell wherein a coating film dotted with cobalt or the like is formed directly on the surface of the hydrogen-absorbing alloy powder without intermediary of an oxide.

In the cell according to the above-mentioned composition, however, there is no oxide formed on the surface of the powder, and the alloy surface therefore becomes flat and smooth with a small reaction area. Consequently, although cobalt or the like is dotted on the alloy surface, its effect as a catalyst cannot be sufficiently utilized.

The manufacturing method of the hydrogen-absorbing alloy with the above-mentioned composition comprises the steps of removing an oxide film on the hydrogen-absorbing alloy powder, then dotting the surface with cobalt or the like by dipping the powder into an aqueous solution containing metallic ions of cobalt or the like, and then washing the powder with water. In the washing process, however, cobalt or the like coated on the surface of the hydrogen-absorbing alloy is likely to be exfoliated and/or oxidized, and therefore cannot exhibit sufficient effect as a catalyst. Moreover, the manufacturing method of the above-mentioned invention requires such complex steps as removing an oxide film on the surface of the hydrogen absorbing alloy powder, washing, and the like, and consequently incurs high manufacturing cost.

SUMMARY OF THE INVENTION

It is an object of the present invention to provide a metal hydride alkaline storage cell having a remarkably improved internal pressure characteristic (high-rate charge characteristic) by sufficiently utilizing the catalytic function of a metal or metal compound on the surface of a hydrogen-absorbing alloy.

It is another object of the present invention to provide a low-cost manufacturing method of a metal hydride alkaline storage cell without complex steps.

One of the aforementioned objects is achieved by a metal hydride alkaline storage cell comprising a positive electrode, a separator impregnated with an electrolyte, and a negative electrode comprising hydrogen-absorbing alloy powder, wherein the hydrogen-absorbing alloy powder has a layer of hydrogen-absorbing alloy oxide formed on the surface thereof, and a catalytic metal or metal compound is dotted on the oxide layer in a granular state by adding a substance selected from the group consisting of a metal fluoride, a metal chloride, a metal iodide, and a metal sulfide, and the proportion of the substance to be added is restricted within the range of from 0.1 to 2.5 wt. % based on the weight of the hydrogen-absorbing alloy powder.

The reason why the aforementioned object is achieved is as follows:

When a layer of hydrogen-absorbing alloy oxide is formed on the surface of hydrogen-absorbing alloy powder, the oxide layer has roughness and thereby results in a large reaction area on the alloy surface. Consequently, when a catalytic metal or metal compound id dotted on the alloy surface, the catalytic action of the metal or metal compound can be fully utilized, and thereby the internal pressure characteristic (high-rate charge characteristic) of the cell is improved.

It is to be noted that the proportion of the metal compound, such as a metal fluoride, to the hydrogen-absorbing alloy powder should be restricted within 0.1 to 2.5 wt. % in the above composition. This is due to the following reasons. First, if the proportion of the metal compound is less than 0.1 wt. %, the catalytic action of the catalytic metal is not sufficiently utilized. On the other hand, if the proportion exceeds 2.5 wt. %, various characteristics of the cell are deteriorated because the amount of the hydrogen-absorbing alloy is reduced in relation to that of the metal compound, and moreover, the absorption of the oxygen gas generated in overcharging is hindered since the surface of the hydrogen-absorbing alloy powder is entirely covered with a reduced metal or metal compound (i.e., a metal or metal compound is not dotted on the surface).

The metal fluoride in the above composition may be at least one metal fluoride selected from the group consisting of a cobalt fluoride, a nickel fluoride, an aluminum fluoride, and a copper fluoride.

When a cobalt fluoride and the like is employed, the deterioration of cell characteristics due to excessive oxidation of a hydrogen-absorbing alloy can be prevented because fluorides are capable of preventing a hydrogen-absorbing alloy from being oxidized.

The metal fluoride in the above composition may be $CoF_2$ and/or $NiF_2$.

When $CoF_2$ or $NiF_2$ is employed, the inner pressure characteristic of the cell can be further improved because cobalt and nickel are excellent in catalytic function.

The metal chloride in the above composition may be a cobalt chloride and/or a nickel chloride.

The metal iodide in the above composition may be a cobalt iodide and/or a nickel iodide.

The metal sulfide in the above composition may be a cobalt sulfide and/or a nickel sulfide.

The hydrogen-absorbing alloy powder in the above composition may be selected from the group consisting of rare-earth element based hydrogen-absorbing alloy powder, Zr—Ni based hydrogen-absorbing alloy powder, Ti—Fe based hydrogen-absorbing alloy powder, Zr—Mn based hydrogen-absorbing alloy powder, Ti—Mn based hydrogen-absorbing alloy powder, and Mg—Ni based hydrogen-absorbing alloy powder.

In addition, the hydrogen-absorbing alloy powder in the above composition can comprise hydrogen-absorbing alloy that has a $CaCu_5$ type crystal structure and is expressed by the general formula, $MmNi_aCo_bAl_cMn_d$ (a>0, b>0,c>0, d≧0, and 4.4≦a+b+c+d≦5.4).

Another object of the present invention is achieved by a manufacturing method of a metal hydride alkaline storage cell comprising the following steps, which are:

the first step of producing a negative electrode by applying a paste on to a substrate, wherein the paste contains hydrogen-absorbing alloy powder and a metal compound which is soluble in the electrolyte and selected from the group consisting of a metal fluoride, a metal chloride, a metal iodide, and a metal sulfide, and the proportion of the aforementioned metal compound to the hydrogen-absorbing alloy powder is from 0 1 to 2.5 wt. %; and the second step of placing the above negative electrode and a positive electrode into a cell can with disposing a separator therebetween, and then pouring an electrolyte into the cell can.

The manufacturing method of a metal hydride alkaline storage cell may also be the method comprising the following steps, which are:

the first step of manufacturing a negative electrode by applying a paste containing hydrogen absorbing alloy powder onto a substrate; and the second step of placing the above negative electrode and a positive electrode into a cell can with disposing a separator therebetween, and then pouring an electrolyte into the cell can, wherein the electrolyte contains a metal compound soluble in an electrolyte and selected from the group consisting of a metal fluoride, a metal chloride, a metal iodide, and a metal sulfide, and the proportion of the aforementioned metal compound to the hydrogen-absorbing alloy is powder from 0.1 to 2.5 wt. %.

A conventional step of washing hydrogen-absorbing alloy powder is unnecessary in the above two manufacturing methods since the formation of catalytic metal particles on the surface of hydrogen-absorbing alloy powder is carried out within a cell. The exfoliation of a metal or metal compound on the surface of the hydrogen-absorbing alloy can therefore be prevented and the catalytic function of the metal or metal compound can be fully utilized.

Furthermore, since complex steps such as a step of removing oxides on the surface of hydrogen-absorbing alloy powder and a washing step become unnecessary in manufacturing cells, cells with excellent characteristics can be easily manufactured.

In addition, while there arises a problem of a wastewater disposal in the methods in which a washing step is necessary, the manufacturing methods of the present invention do not include a washing step, and therefore cause no such problems.

The metal fluoride in the above methods may be at least one metal fluoride selected from the group consisting of a cobalt fluoride, a nickel fluoride, an aluminum fluoride, and a copper fluoride.

The metal fluoride in the above methods may be $CoF_2$ and/or $NiF_2$.

The metal chloride in the above methods may be a cobalt chloride and/or a nickel chloride.

The metal iodide in the above methods may be a cobalt iodide and/or a nickel iodide.

The metal sulfide in the above methods may be a cobalt sulfide and/or a nickel sulfide.

The hydrogen-absorbing alloy powder in the above methods may be selected from the group consisting of rare-earth element based hydrogen-absorbing alloy powder, Zr—Ni based hydrogen-absorbing alloy powder, Ti—Fe based hydrogen-absorbing alloy powder, Zr—Mn based hydrogen-absorbing alloy powder, Ti—Mn based hydrogen-absorbing alloy powder, and Mg—Ni based hydrogen-absorbing alloy powder.

In addition, the hydrogen-absorbing alloy powder in the above methods may comprise hydrogen-absorbing alloy that has a $CaCu_5$ type crystal structure and is expressed by the general formula $MmNi_aCo_bAl_cMn_d$ where a>0, b>0, c>0, d≧0, and 4.4≦a+b+c+d≦5.4.

DESCRIPTION OF THE PREFERRED EMBODIMENTS

EMBODIMENT 1

EXAMPLE 1

(The Preparation of Hydrogen-absorbing Alloy Powder)

A commercially available misch metal (Mm: a mixture of rare earth elements such as La, Ce, Nd, and Pr), nickel (Ni), cobalt (Co), aluminum (Al) and manganese (Mn) were mixed in an element ratio of 1:3.2:1.0:0.2:0.6.

Then, the mixture was fused in a high-frequency induction furnace at a temperature of 1500° C. and the fused matter was cooled down. A hydrogen-absorbing alloy ingot represented by the composition formula $MmNi_{3.2}Co_{1.0}Al_{0.2}Mn_{0.6}$ was thus obtained. Subsequently, this hydrogen-absorbing alloy ingot was pulverized, and hydrogen-absorbing alloy powder with particle sizes of from 10 to 70 μm was thereby obtained.

(The Preparation of a Negative Electrode)

A mixture was prepared by mixing 10 parts of weight of the aforementioned hydrogen-absorbing alloy powder and 0.1 wt. % based on the weight of the hydrogen-absorbing alloy, of $CoF_2$ (metal fluoride soluble in an electrolyte), and then a paste was prepared by dispersing the mixture in 1 part by weight of an aqueous solution containing 5 wt. % of PEO (polyethylene oxide). Subsequently, the resulting paste was applied on to a substrate (composed of a punching metal where nickel is plated on to iron), and then the substrate with the paste was flat-rolled in order to obtain a negative electrode with a plate shape.

(The Preparation of a Cell)

A generating element was prepared by coiling the aforementioned negative electrode and a publicly known sintered type nickel electrode together with a separator disposed therebetween. Then, the generating element was put into a cell can, following which an electrolyte consisting of 30% of KOH was poured into the cell can, and a AA size cell was thus prepared.

The thus prepared cell is hereinafter referred to as 'a cell A1of the present invention'.

It is to be noted that the above-mentioned cell is a positive electrode dominated cell, and that the cell capacity is 1200 mAh. It is also to be noted that charging the cell renders cobalt dotted on the surface of hydrogen-absorbing alloy powder in a granular state.

EXAMPLES 2–4

The cells of Examples 2 to 4 were prepared in the same manner as Example 1 except that the amount of $CoF_2$ to be added was 0.5 wt. %, 1.0 wt. %, or 2.5 wt. % respectively, each based on the weight of the hydrogen-absorbing alloy.

The cells thus prepared are hereinafter referred to as 'a cell A2 of the present invention', 'a cell A3 of the present invention', and 'a cell A4 of the present invention' respectively.

COMPARATIVE EXAMPLE 1

The cell of Comparative Example 1 was prepared in the same manner as Example 1 except $CoF_2$ was not added.

The thus prepared cell is hereinafter referred to as 'a comparative cell X1'.

COMPARATIVE EXAMPLES 2 and 3

The cells of Comparative Examples 2 and 3 were prepared in the same manner as Example 1 except that the amount of $CoF_2$ to be added was 0.07 wt. % or 3.0 wt. % respectively, each based on the weight of the hydrogen-absorbing alloy.

The cells thus prepared are hereinafter referred to as 'a comparative cell X2', and 'a comparative cell X3', respectively.

COMPARATIVE EXAMPLE 4

The cell of Comparative Example 4 was prepared according to the manner disclosed in Japanese Unexamined Patent Application No. 08-333603 mentioned hereinbefore. More specifically, 10 parts by weight of hydrogen-absorbing alloy particles were added to an aqueous solution of fluoric acid consisting of 20 parts by weight of water, 20 parts by weight of 40% hydrofluoric acid, and 20 parts by weight of nitric acid, and then they were stirred. The treated hydrogen-absorbing alloy particles were then washed with water. Subsequently, a solution in which 1 part by weight of hydrochloric acid was added to 50 parts by weight of a saturated aqueous solution of $CoF_2$ was added to the treated hydrogen-absorbing alloy particles, and then the solution was stirred. The treated hydrogen-absorbing alloy particles were then washed with water. The amount of $CoF_2$ to be added was 1.0 wt. % based on the weight of the hydrogen-absorbing alloy.

The cell thus prepared is hereinafter referred to as 'a comparative cell X4'.

EXPERIMENT

The inner pressure characteristics of the above-mentioned cells A1 to A4 of the present invention and comparative cells X1 to X4 were examined. The test results are shown in table 1. It is to be understood that the experiments were carried out as follows:

Each cell was charged at an electric current of 1200 mA (1C) at room temperature, and the time until the inner pressure of the cell reached 10 kgf/cm$^2$ was measured. Per each example, 4 sample cells were subjected to the test. The average value of those 4 sample cells is employed as the inner pressure characteristic herein.

TABLE 1

| Cell | Surface treatment | Additive | Additive amount (wt. %) | Inner pressure characteristic (minute) |
| --- | --- | --- | --- | --- |
| Comparative cell X1 | — | — | 0 | 80 |
| Comparative cell X2 | — | $CoF_2$ | 0.07 | 85 |
| Cell A1 | — | $CoF_2$ | 0.1 | 160 |
| Cell A2 | — | $CoF_2$ | 0.5 | 175 |
| Cell A3 | — | $CoF_2$ | 1.0 | 180 |
| Cell A4 | — | $CoF_2$ | 2.5 | 170 |
| Comparative cell X3 | — | $CoF_2$ | 3.0 | 90 |
| Comparative cell X4 | treated | $CoF_2$ | 1.0 | 95 |

As apparent in Table 1, the comparative cells X1 to X4 showed inner pressure characteristics of 95 minutes or less, while the cells A1 to A4 of the present invention showed the values of 160 minutes or higher, which demonstrates that the inner characteristics are greatly improved in the present invention.

In consideration of the above results, it is necessary to add a metal fluoride ($CoF_2$ in the above experiment) to hydrogen-absorbing alloy powder without surface-treating by hydrofluoric acid and the like, and to restrict the amount of the metal fluoride to be added within the range of 0.1 to 2.5 wt. %.

EMBODIMENT 2

EXAMPLE 1

The cell A3 was employed as a cell of Example 1, which is described in Embodiment 1, Example 3, hereinbefore.

EXAMPLES 2 to 4

The cells of Examples 2 to 4 were prepared in the same manner as the above Example 1 except that $NiF_2$, $CuF_2$, or $AlF_3$ was added in place of $CoF_2$.

The cells thus prepared are hereinafter referred to as 'a cell B1 of the present invention', 'a cell B2 of the present invention', and 'a cell B3 of the present invention' respectively.

EXAMPLES 5 and 6

The cells of Examples 5 and 6 were prepared in the same manner as the above Example 1 except that $CoCl_2$ or $NiCl_2$ was added in place of $CoF_2$.

The cells thus prepared are hereinafter referred to as 'a cell B4 of the present invention' and 'a cell B5 of the present invention' respectively.

EXAMPLES 7 and 8

The cells of Examples 7 and 8 were prepared in the same manner as the above Example 1 except that $CoI_2$ or $NiI_2$ was added in place of $CoF_2$.

The cells thus prepared are hereinafter referred to as 'a cell B6 of the present invention' and 'a cell B7 of the present invention' respectively.

EXAMPLES 9 and 10

The cells of Examples 9 and 10 were prepared in the same manner as the above Example 1 except that $CoSO_4$ or $NiSO_4$ was added in place of $CoF_2$.

The cells thus prepared are hereinafter referred to as 'a cell B8 of the present invention' and 'a cell B9 of the present invention' respectively.

COMPARATIVE EXAMPLE 1

The cell of Comparative Examples 1 was prepared in the same manner as the above Example 1 except that CoO was added in place of $CoF_2$.

The cell thus prepared is hereinafter referred to as 'a comparative cell Y'.

COMPARATIVE EXAMPLE 2

The comparative cell X1 was employed as a cell of Comparative Example 2, which is described in Embodiment 1, Comparative Example 1, hereinbefore.

EXPERIMENT

The inner pressure characteristics of the above-mentioned cells A3, and B1 to B9 of the present invention and comparative cells X1 to X4 were examined. The test results are shown in table 2. It is to be understood that the conditions of the experiment are the same as those of the experiment in Embodiment 1.

TABLE 2

| Cell | Additive | Additive amount (wt. %) | Inner pressure characteristic (minute) |
| --- | --- | --- | --- |
| Cell A3 | $CoF_2$ | 1.0 | 180 |
| Cell B1 | $NiF_2$ | 1.0 | 175 |
| Cell B2 | $CuF_2$ | 1.0 | 155 |
| Cell B3 | $AlF_3$ | 1.0 | 150 |
| Cell B4 | $CoCl_2$ | 1.0 | 105 |
| Cell B5 | $NiCl_2$ | 1.0 | 105 |
| Cell B6 | $CoI_2$ | 1.0 | 105 |
| Cell B7 | $NiI_2$ | 1.0 | 100 |
| Cell B8 | $CoSO_4$ | 1.0 | 105 |
| Cell B9 | $NiSO_4$ | 1.0 | 105 |
| Comparative cell Y | CoO | 1.0 | 70 |
| Comparative cell X1 | — | — | 80 |

As apparent in table 2, the comparative cells X1 and Y showed the inner pressure characteristics of 80 minutes or less, while the cells A3 and B1 to B9 of the present invention showed the values of 100 minutes or higher, which demonstrates that the inner characteristics are improved in the present invention. The cells A3 and B1 to B3 of the present invention, all of which employed a metal fluoride as an additive, showed the particularly large inner pressure characteristic values of 150 minutes or higher, and among those cells, particularly the cells A3 and B1 showed the remarkably large inner pressure characteristic values of 175 minutes or higher.

In consideration of the above results, metal fluorides are more preferable as the additive to hydrogen-absorbing alloy powder than metal chlorides, metal iodides, or metal sulfides. Particularly, $CoF_2$ and $NiF_2$ are the most preferable.

(Other Notes)

(1) The effects of the present invention are more apparent in high-rate charge where a cell is charged at an electric current of 1 to 2C than in low-rate charge where a cell is charged at about 0.3C. This is due to the following reason. In high-rate charge, oxygen gas is generated in a greater amount than in low-rate charge. However, the cells according to the present invention have remarkably excellent capability of absorbing oxygen gas, and therefore, even if a great amount of oxygen gas is generated, it can be well absorbed in the negative electrodes.

(2) The hydrogen-absorbing alloy to be used in the present invention is not limited to a rare-earth element based hydrogen-absorbing alloy, which was used in the examples. Among the types of the hydrogen-absorbing alloys usable for the cells of the present invention are Zr—Ni based hydrogen-absorbing alloy such as Zr—Ni, Ti—Fe based hydrogen-absorbing alloy such as TiFe, Zr—Mn based hydrogen-absorbing alloy such as $ZrMn_2$, Ti—Mn based hydrogen-absorbing alloy such as $TiMn_{1.5}$, Mg—Ni based hydrogen-absorbing alloy such as $Mg_3Ni$, and the like.

(3) The hydrogen-absorbing alloy particularly preferable for a metal-hydride storage cell has a CaCu5 type crystal structure and is represented by the general formula, $MmNi_a Co_b Al_c Mn_d$ where $a>0$, $b>0$, $c>0$, $d \geq 0$, and $4.4 \leq a+b+c+d \leq 5.4$. In the formula, Mm is a mixture of the rare-earth elements selected from the group consisting of La, Ce, Pr, Nd, Sm, Eu, Sc, Y, Pm, Gd, Tb, Gy, Ho, Er, Tm, Yb, and Lu. Particularly preferred is a Mm mainly consisted of a mixture of La, Ce, Pr, Nd, and Sm.

The hydrogen-absorbing alloy powder according to the above composition is capable of achieving basic characteristics of alkaline secondary batteries such as cycle characteristic and discharge characteristic to a satisfactory degree. It is also to be noted that Si, C, W, and B can be added unless they do not affect hydrogen storage characteristic of the hydrogen-absorbing alloy.

Further, it is preferable to restrict the amount of nickel (a) within $2.8 \leq a \leq 5.2$, the amount of cobalt (b) within $0<b \leq 1.4$ in the above general formula. In order to obtain a higher cell capacity, it is preferable that the amount of aluminum (c) is $c \leq 1.0$, and the amount of manganese (d) is $d \leq 1.0$.

(4) Substrates usable for hydrogen-absorbing alloy electrode include conductive and alkali-resisting substrates composed of punched metal where nickel is plated on iron, foamed nickel, or sintered nickel fiber.

What is claimed is:

1. A metal hydride alkaline storage cell comprising:

a positive electrode;

a separator impregnated with an electrolyte; and a negative electrode comprising:
      a hydrogen-absorbing alloy
      a layer of hydrogen-absorbing alloy oxide formed on the surface of said hydrogen-absorbing alloy, and
      a catalytic metal dotted on said layer of hydrogen-absorbing alloy oxide in a granular state by adding an electrolyte soluble substance, said substance selected from the group consisting of a metal fluoride, a metal iodide, and a metal sulfide, and a proportion of said substance to said hydrogen-absorbing alloy powder is restricted within the range of 0.1 to 2.5 wt. %.

2. The metal hydride alkaline storage cell of claim 1 wherein said metal fluoride is at least one metal fluoride selected from the group consisting of a cobalt fluoride, a nickel fluoride, an aluminum fluoride, and a copper fluoride.

3. The metal hydride alkaline storage cell of claim 1 wherein said metal fluoride is $CoF_2$ and/or $NiF_2$.

4. The metal-hydride alkaline storage cell of claim 1, 2 or 3 wherein said hydrogen-absorbing alloy powder comprises hydrogen-absorbing alloy having a $CaCu_5$ type crystal structure expressed by the general formula $MmNi_a Co_b Al_c Mn_d$, where $a>0$, $b>0$, $c>0$, $d \geq 0$, and $4.4 \leq a+b+c+d \leq 5.4$.

* * * * *